J. S. BRANDON.
LINE SPLICE.
APPLICATION FILED JULY 24, 1913.
1,155,334.
Patented Oct. 5, 1915.
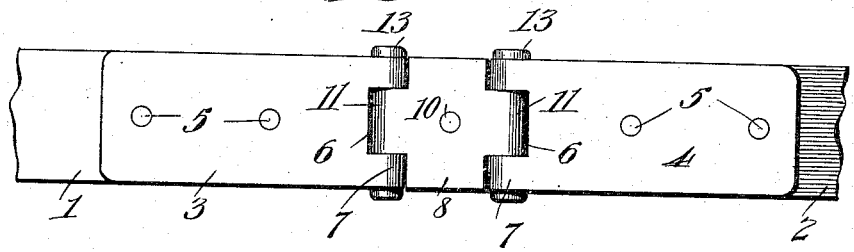
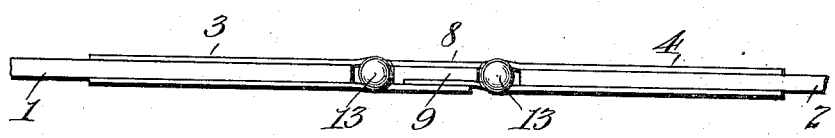
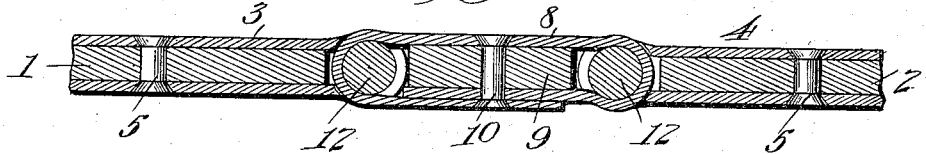
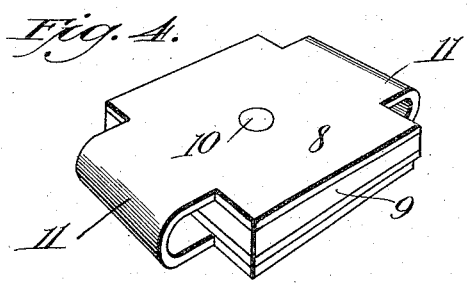
Witnesses
Inventor
J. S. Brandon
By E. B. Stocking
Attorney

UNITED STATES PATENT OFFICE.

JAMES S. BRANDON, OF ALBIN, WYOMING.

LINE-SPLICE.

1,155,334. Specification of Letters Patent. Patented Oct. 5, 1915.

Application filed July 24, 1913. Serial No. 780,947.

*To all whom it may concern:*

Be it known that I, JAMES S. BRANDON, a citizen of the United States, residing at Albin, in the county of Laramie and State of Wyoming, have invented certain new and useful Improvements in Line-Splices, of which the following is a specification, reference being had therein to the accompanying drawing.

This invention relates to certain new and useful improvements in rein splices; the object of the invention being to provide a splice for a driving rein or a line which is exceedingly light and simple in construction and one which can be readily placed in position on the broken ends of the line in order to connect the same.

Another object of my invention is to provide a rein splice which will allow free movement of the line when in position thereon.

Other and further objects and advantages of the invention will be hereinafter set forth and the novel features thereof defined by the appended claim.

In the drawing—Figure 1, is a plan view of my improved splice, showing the same in position upon a line; Fig. 2, is a side elevation of the same; Fig. 3, is a longitudinal enlarged vertical section; and Fig. 4, is a perspective of the coupling member detached.

Like numerals of reference refer to like parts in the several figures of the drawings.

In the drawing, 1 and 2 indicate the ends of the line adapted to be connected together and over which are arranged plates 3 and 4 which are substantially U-shape being formed by bending the same back in order to embrace the ends 1 and 2; these embracing portions being secured to the ends of the line by rivets 5 passing transversely through the line as clearly shown. The free ends of the plates 3 and 4 extend slightly beyond the ends of the lines 1 and 2 and are cut away or notched centrally as shown at 6 to the form spaced eyes 7. From the above description, it will be seen that the broken ends of the line by the application of these plates thereto, are completely protected by the plates.

In connection with the plates, I employ a coupling member 8 which is formed of a single strip of metal bent around a filler 9 formed of leather; the overlapping ends thereof being secured together and upon the filler by a rivet 10 as clearly shown, and said coupling member is provided with oppositely disposed, outwardly projecting, centrally arranged eyes 11 adapted to fit between the eyes 7 in order to bring the same into register with the eyes 7 so as to allow the pintle pins 12 to be passed transversely through the registering eyes; said pintle pins having their ends swaged to form heads 13.

In the above construction, I have shown a splice which is so constructed that the the broken ends of a line may be connected together without reducing the length of a line as in some instances, the point of break is so ragged that it is necessary to trim the ends of the line and by substituting the coupling member carrying the filler, the piece removed from the line is replaced by the coupling member, whereby a line splice is formed having free movement to move in either direction. It will also be seen that in the construction of splice as shown, that a substantially double hinge is formed by a coupling member which is pivotally mounted upon a pintle pin carried by plates fixed on the ends of the line.

From the foregoing description, it will be seen that I have provided a line splice which is formed of sheet metal comprising a pair of end-embracing members and a central coupling member pivotally connected together in such a manner that an exceedingly strong splice is formed.

I claim:

A line splice, comprising a pair of embracing members having spaced eyes at their free ends, said members being formed of strips of metal bent to form substantially U-shaped members adapted to be secured to a line, a coupling member having oppositely disposed reduced ends forming eyes adapted to fit between the spaced eyes of the embracing members, said coupling member being formed of a single piece of metal bent to form an oblong loop having overlapping ends, a filler arranged in said loop, a centrally arranged rivet extending through the overlapping ends of said loop for securing said filler therein, and pintle pins extending through the eyes of the embracing members and coupling members having their ends swaged to form heads.

In testimony whereof I affix my signature in presence of two witnesses.

JAMES S. BRANDON.

Witnesses:
C. L. BEATTY,
WM. BAMBER.

Copies of this patent may be obtained for five cents each, by addressing the "Commissioner of Patents, Washington, D. C."